United States Patent
Sako

(10) Patent No.: US 7,284,128 B2
(45) Date of Patent: Oct. 16, 2007

(54) RECORDING MEDIUM, RECORDING MEDIUM METHOD AND APPARATUS, INFORMATION SIGNAL OUTPUT CONTROL METHOD, RECORDING MEDIUM REPRODUCING APPARATUS, SIGNAL TRANSMISSION METHOD, AND CONTENT DATA

(75) Inventor: Yoichiro Sako, Tokyo (JP)

(73) Assignee: Sony Corporation (JP)

( * ) Notice: Subject to any disclaimer, the term of this patent is extended or adjusted under 35 U.S.C. 154(b) by 856 days.

(21) Appl. No.: 10/204,982

(22) PCT Filed: Dec. 25, 2001

(86) PCT No.: PCT/JP01/11341

§ 371 (c)(1),
(2), (4) Date: Oct. 21, 2002

(87) PCT Pub. No.: WO02/054381

PCT Pub. Date: Jul. 11, 2002

(65) Prior Publication Data

US 2003/0108200 A1    Jun. 12, 2003

(30) Foreign Application Priority Data

Dec. 28, 2000 (JP) ............... 2000-401999

(51) Int. Cl.
*H04L 9/00* (2006.01)

(52) U.S. Cl. ............... 713/176; 713/193; 380/201; 380/210; 382/100; 283/113

(58) Field of Classification Search ............... 713/176, 713/193; 369/53.21; 382/100, 232; 386/94; 380/202, 269, 201, 210; 283/113
See application file for complete search history.

(56) References Cited

U.S. PATENT DOCUMENTS

| | | | |
|---|---|---|---|
| 5,809,139 A * | 9/1998 | Girod et al. | 380/202 |
| 6,591,365 B1 * | 7/2003 | Cookson | 713/176 |
| 6,674,874 B1 * | 1/2004 | Yoshida et al. | 382/100 |
| 6,707,774 B1 * | 3/2004 | Kuroda et al. | 369/53.21 |
| 6,804,452 B1 * | 10/2004 | Kuroda et al. | 386/94 |

* cited by examiner

*Primary Examiner*—Kim Vu
*Assistant Examiner*—Baotran N. To
(74) *Attorney, Agent, or Firm*—Lerner, David, Littenberg, Krumholz & Mentlik, LLP

(57) ABSTRACT

A record medium for recording an information signal in which a first watermark and a second watermark have been embedded, the first watermark being embedded when the information signal is transmitted as an analog signal, the second watermark being embedded when the information signal is further transmitted.

5 Claims, 7 Drawing Sheets

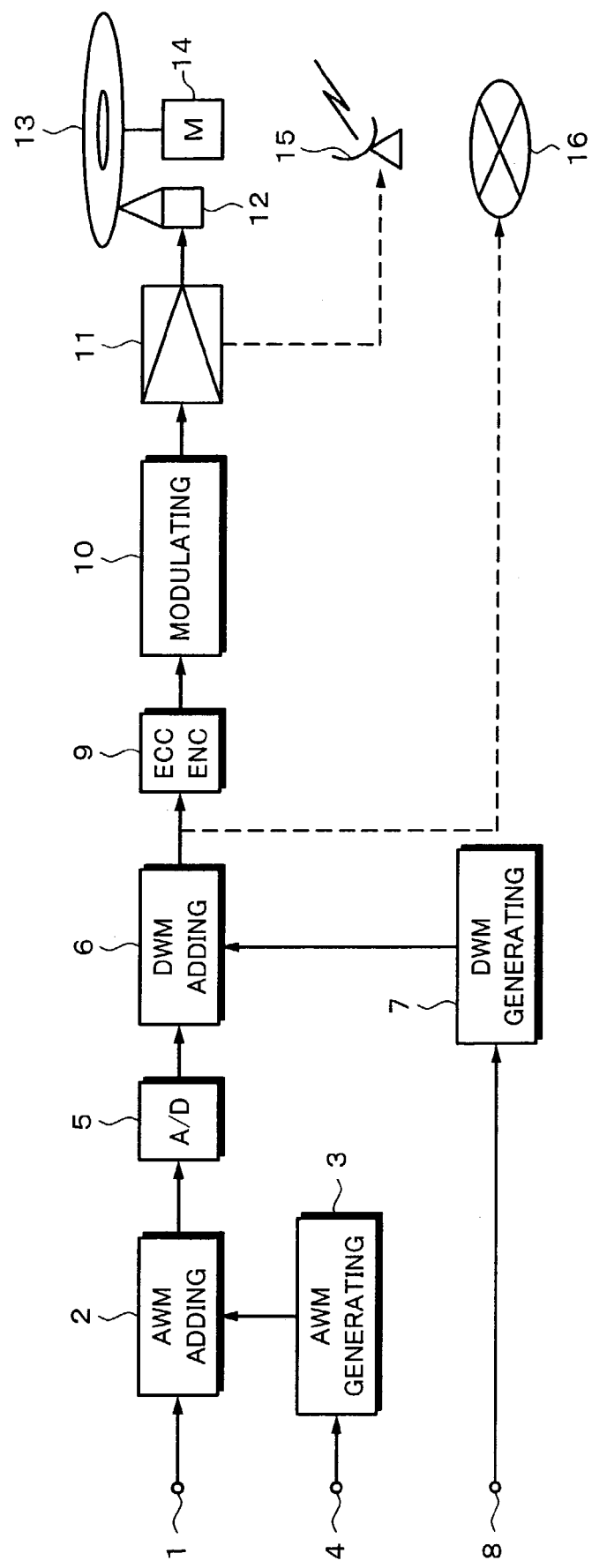

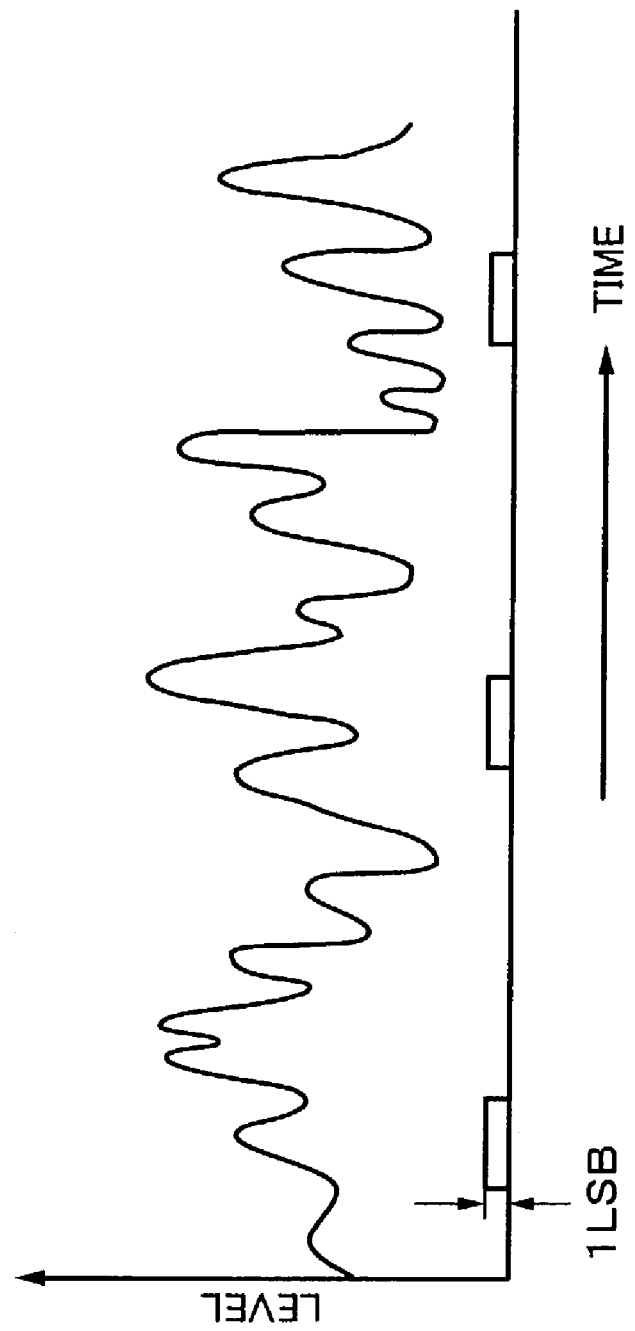

RECORDING MEDIUM, RECORDING MEDIUM METHOD AND APPARATUS, INFORMATION SIGNAL OUTPUT CONTROL METHOD, RECORDING MEDIUM REPRODUCING APPARATUS, SIGNAL TRANSMITTING METHOD, AND CONTENT DATA

TECHNICAL FIELD

The present invention relates to a record medium, a recording method thereof, a recording apparatus therefor, an output controlling method for an information signal, a reproducing apparatus for a record medium, a signal transmitting method, and content data that allow copyright information to be embedded as a watermark in content data.

BACKGROUND ART

As network technologies such as the Internet have been advanced, content data such as music data and picture data have been freely distributed. As a result, copyright protection technologies have become increasingly important. As one of the copyright protecting technologies, a watermark technology for embedding copyright information in content data is known. Although a watermark has a function for embedding copyright information in content data such as music data, picture data, and so forth, it is difficult to distinguish music data, picture data, and so forth in which a watermark has been embedded from those in which no watermark has been embedded. Using dedicated hardware or software, copyright information concealed in content data can be detected.

However, conventionally, it was assumed that a watermark could be transmitted as both an analog signal and a digital signal without any problem. To prevent a watermark from affecting visual and auditory senses of data as a content and from being lost during the transmission thereof while satisfying such a condition, the strength of the watermark should be improved. To do that, the embedding process and the detecting process for the watermark become complicated.

OBJECT AND SUMMARY OF THE INVENTION

Therefore, an object of the present invention is to provide a record medium, a recoding method therefor, a recoding apparatus therefor, an output controlling method for an information signal, a reproducing apparatus for a record medium, a signal transmitting method, and content data that prevent a watermark embedding process or a watermark detecting process from becoming complicated.

DISCLOSURE OF THE INVENTION

To solve the forgoing problem, the invention provides a record medium for recording an information signal in which a first watermark and a second watermark have been embedded, the first watermark being transmitted when the information signal is transmitted as an analog signal, the second watermark being transmitted when the information signal is transmitted.

The invention is also a recording method for a record medium, comprising the steps of adding a first watermark to an input information signal, the first watermark being transmitted when the information signal is transmitted as an analog signal, converting the information signal to which the first watermark has been added into a digital signal, adding a second watermark to the converted digital signal, the second watermark being transmitted when the information signal is transmitted as a digital signal, performing an encoding process for the signal to which the second watermark has been added, and recording the signal for which the encoding process has been performed to the record medium.

The invention is further a recording apparatus for a record medium, comprising a first adding portion for adding a first watermark to an input information signal, the first watermark being transmitted when the information signal is transmitted as an analog signal, a converting portion for converting the information signal to which the first watermark has been added into a digital signal, a second adding portion for adding a second watermark to the converted digital signal, the second watermark being transmitted when the information signal is transmitted as a digital signal, an encode processing portion for performing an encoding process for the signal to which the second watermark has been added, and a recording portion for recording output data of the encode processing portion to the record medium.

The invention involves a method for controlling an output of an information signal, the method comprising the steps of reading an information signal from a record medium, a first watermark and a second watermark having been embedded in the information signal, the first watermark being transmitted when the information signal is transmitted as an analog signal, the second watermark being transmitted when the information signal is transmitted as a digital signal, determining whether or not a condition represented by the first watermark matches a condition represented by the second watermark when both the first watermark and the second watermark are detected, and controlling the output of the information signal that is read from the record medium so as to copy the information signal corresponding to conditions represented by the first watermark and the second watermark when a condition represented by the first watermark matches a condition represented by the second watermark.

The invention includes a reproducing apparatus for a record medium, comprising a decoder for decoding an information signal that is read from a record medium, a first watermark and a second watermark having been embedded in the information signal, the first watermark being transmitted when the information signal is transmitted as an analog signal, the second watermark being transmitted when the information signal is transmitted as a digital signal, a first detecting portion for detecting the first watermark from the output signal of the decoder, a second detecting portion for detecting the second watermark from the output signal of the decoder, and a controlling portion for outputting a control signal that causes one of the first watermark and the second watermark added to the output signal of the decoder to be rewritten corresponding to a condition represented by the other watermark corresponding to detected outputs of the first detecting portion and the second detecting portion.

The invention is also a signal transmitting method, comprising the steps of adding a first watermark to an input information signal, the first watermark being transmitted when the information signal is transmitted as an analog signal, converting the information signal to which the first watermark has been added into a digital signal, adding a second watermark to the converted digital signal, the second watermark being transmitted when the information signal is transmitted as a digital signal, and outputting the signal to which the second watermark has been added.

The invention is further a content data in which a first watermark and a second watermark have been embedded, the first watermark being transmitted when the content data is transmitted as an analog signal, the second watermark being transmitted when the content data is transmitted as a digital signal.

According to the present invention, since both a digital watermark and an analog watermark are embedded in an information signal, they can be left in both an analog transmission and a digital transmission. According to the present invention, since a digital watermark and an analog watermark are independently used, they can be easily detected. In addition, they can be easily recoded and rewritten.

BRIEF DESCRIPTION OF DRAWINGS

FIG. 1 is a block diagram showing a recording apparatus according to an embodiment of the present invention;

FIG. 3 is a schematic diagram for explaining an example of a digital watermark;

DETAILED DESCRIPTION OF PREFERRED EMBODIMENTS

Figure 2A:
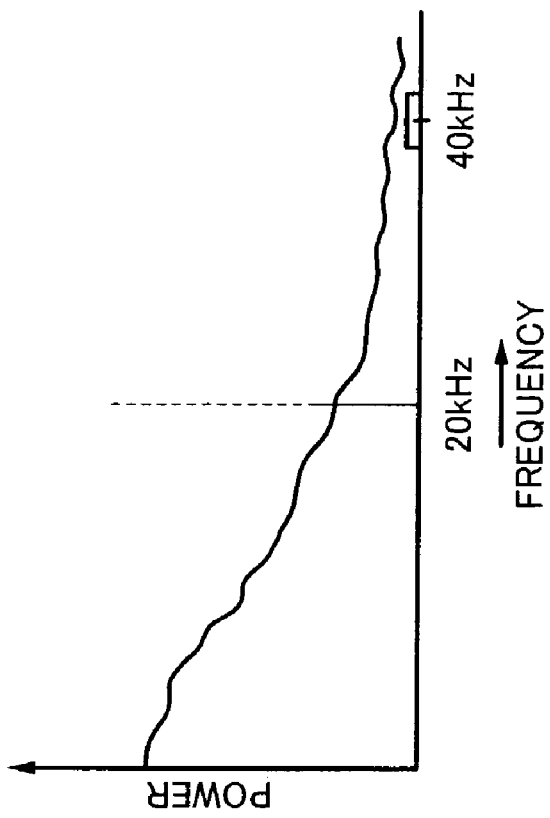
FIG. 2 is a schematic diagram for explaining an example of an analog water.

Next, with reference to the accompanying drawings, embodiments of the present invention will be described. According to the present invention, two types of watermarks are used. In other words, an analog watermark AWM suitable for an analog transmission and a digital watermark DWM suitable for a digital transmission are used.

FIG. 1 shows a recoding apparatus according to an embodiment of the present invention. Reference numeral 1 represents an input terminal. An information signal to be recorded as a content for example an audio signal is supplied to the input terminal 1. An AWM adding circuit 2 adds an analog watermark to the input information signal. The analog watermark is generated by an AWM generating portion 3. Copyright information as an analog signal is supplied from an input terminal 4 to the AWM generating portion 3.

The information signal in which the analog watermark has been embedded is supplied from the AWM adding circuit 2 to an A/D converter 5. The A/D converter 5 converts the information signal as an analog signal into a digital information signal. The digital information signal is supplied to a DWM adding circuit 6. The DWM adding circuit 6 adds a digital watermark to the digital information signal supplied from the A/D converter 5. The digital watermark is generated by a DWM generating portion 7. Copyright information as a digital signal is supplied from an input terminal 8 to the DWM generating portion 7. The copyright information as the digital signal supplied to the input terminal 8 is copyright information same as that supplied to the input terminal 4. Alternatively, the copyright information supplied to the input terminal 8 is copyright information having a stricter copy condition than that supplied to the input terminal 4.

The copyright information includes identification information with respect to copyright, copy management information, and so forth. The identification information includes for example a composer name, a performer name, a record company name, and so forth. The copy management information includes copy permission/prohibition, generation restriction, number of times of copy operation, and so forth.

An output signal of the DWM adding circuit 6 is supplied to an error correction encoding circuit 9. The error correction encoding circuit 9 performs an error correction encoding process for the output signal of the DWM adding circuit 6. An output signal of the error correction encoding circuit 9 is supplied to a modulating circuit 10. The modulating circuit 10 performs a digital modulating process for the output signal of the error correction encoding circuit 9. The modulating circuit 10 performs a digital modulation in such a manner that a DC component of the record signal is decreased. An output signal of the modulating circuit 10 is supplied to an optical pickup 12 through a recording amplifier 11. The optical pickup 12 records a signal to an optical disc 13. The optical disc 13 is rotated by a spindle motor 14.

The recording apparatus shown in FIG. 1 can use a CD (Compact Disc) mastering record disc and a recordable optical disc (in reality, a CD-R (Recordable), a CD-RW (ReWritable), an MD (Mini Disc), a DVD (Digital Versatile Disc or Digital Video Disc)-R, DVD-RAM, and so forth). In addition, the recording apparatus can use a magnetic tape, a magnetic disc, a semiconductor memory (for example, an IC card) as well as such optical discs. In addition, the present invention is not limited to that case that an information signal as a content is recorded to a record medium. Instead, as denoted by a broken line of FIG. 1, an information signal as a content may be transmitted as a broadcast signal through an antenna 15. In addition, as denoted by another broken line of FIG. 1, output data of the DWM adding circuit 6 may be transmitted as a content to a network 16.

An analog watermark effectively functions in an analog transmission of an information signal. In other words, the analog watermark is not strongly transmitted in a digital transmission. In the worst case, the analog watermark is lost in the digital transmission. In contrast, a digital watermark is strong in a digital transmission of an information signal. In the worst case, the digital watermark is lost in an analog transmission of an information signal. It is possible to add an analog on the next stage of the A/D converter 5. Likewise, it is possible to add a digital watermark on the preceding stage of the A/D converter 5. A plurality of types of analog watermarks and digital watermarks that vary in their strength can be used. The strength of a watermark is a degree that represents whether it is subject to be lost in a transmission of the information signal. In addition to an analog watermark and a digital watermark, a strong watermark SWM may be added to an information signal in an analog transmission and a digital transmission.

When a strong watermark has been added to an information signal, it is copied as a digital signal. In other words, when a digital copy is performed, a strong watermark and a digital watermark function. The information signal is copied as an analog signal. In other words, when an analog copy is performed, a strong watermark and an analog watermark function. In this case, when only a strong watermark has been added to an information signal, it is supposed that both an analog transmission and a digital transmission have been performed for the information signal (for example, a second generation copy has been performed). Alternatively, it is supposed that a special signal process such as a compressing process has been performed in a transmission of the information signal. Normally, copy management information of a digital content in the case that an information signal is digital data permits a one generation copy for a digital signal. Thus, when the copy for an information signal is limited to one generation, as was described above, if only a strong watermark is detected, since there is a possibility of which only a strong watermark is left as a result of a proper process for the information signal, the copy for an information signal as a content is prohibited.

Figure 2B:
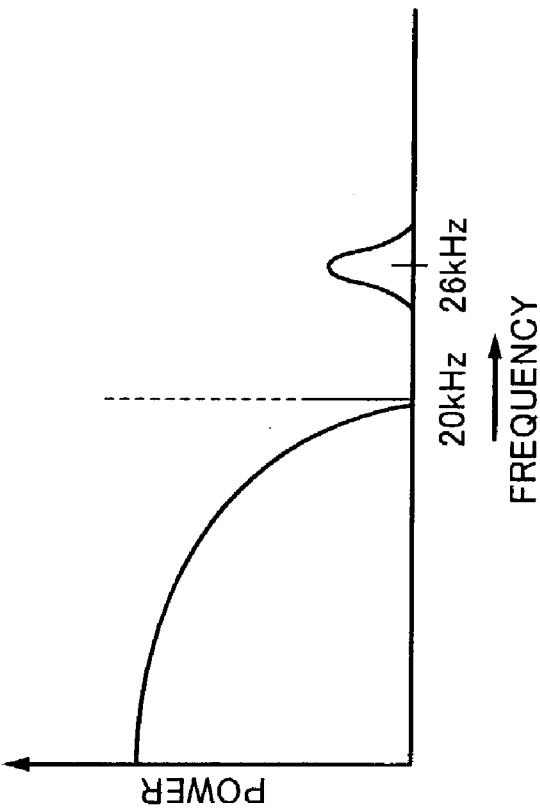

FIGS. 2A and 2B show examples of analog watermarks. As a known analog watermark embedding method, an analog watermark is embedded to a frequency band (for example, 20 kHz or higher frequency band) in which the watermark does not affect an audio signal as an information signal that has been acoustically converted by a spread spectrum process and reproduced. According to the present invention, a watermark is directly embedded to a high frequency band of an information signal. When the frequency band of an audio signal is limited to 20 kHz as with the CD standard, as shown in FIG. 2A, a carrier having a frequency band of for example 26 kHz is modulated with copyright information so as to generate an analog watermark. In contrast, when an audio signal having a frequency band of for example 48 kHz is recorded as with the DVD audio standard, as shown in FIG. 2B, a carrier having a frequency of for example 40 kHz is modulation-encoded with copyright information so as to generate an analog watermark.

FIG. 3 schematically shows an example of a digital watermark. In FIG. 3, an audio signal as an information signal illustrated as a waveform of an analog signal is converted into a digital signal. With the least significant bit LSB of for example 16 bits or 24 bits of data of each sample, copyright information is embedded. In other words, each sample contains one bit of copyright information.

Figure 4:
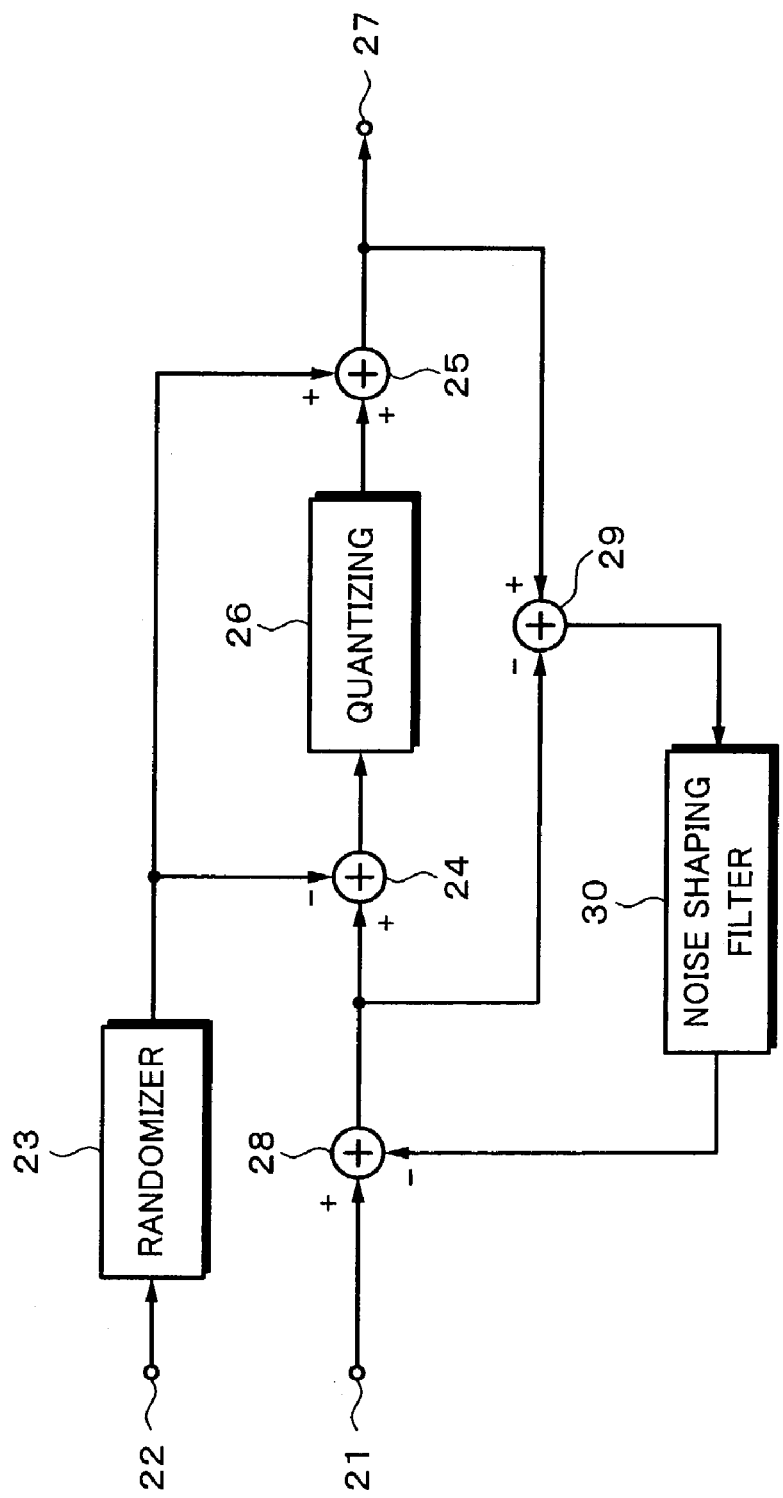
FIG. 4 is a block diagram showing an example of the structure for generating a digital watermark.

FIG. 4 shows an example of the structure of a DWM generating portion that generates such a digital watermark. In FIG. 4, reference numeral 21 represents an input terminal. An audio signal as a content is input to the input terminal 21. Reference numeral 22 represents an input terminal. Copyright information is input to the input terminal 22. The copyright information that is input from the input terminal 22 is supplied to a combining device 24 through a randomizer 23. The DWM generating portion has a quantizer 26. The quantizer 26 is disposed between the combining device 24 and a combining device 25. An output signal of the combining device 25 is obtained from an output terminal 27.

In the DWM generating portion shown in FIG. 4, the audio signal as a content that is input from the input terminal 21 is supplied to a combining device 28. An output signal of the combining device 28 is supplied to the combining device 24 and a combining device 29. An output signal of the combining device 25 is fed back to the combining device 29. An output signal of the combining device 29 is fed back to the combining device 28 through a noise shaping filter 30.

The randomizer 23 randomizes data of the copyright information that is input from the input terminal 22. The noise shaping filter 30 adjusts distortion so that total noise lowers. In the structure shown in FIG. 4, the problem of which copyright information that has been embedded to an audio signal as a content affects the auditory sense can be solved.

Figure 5:
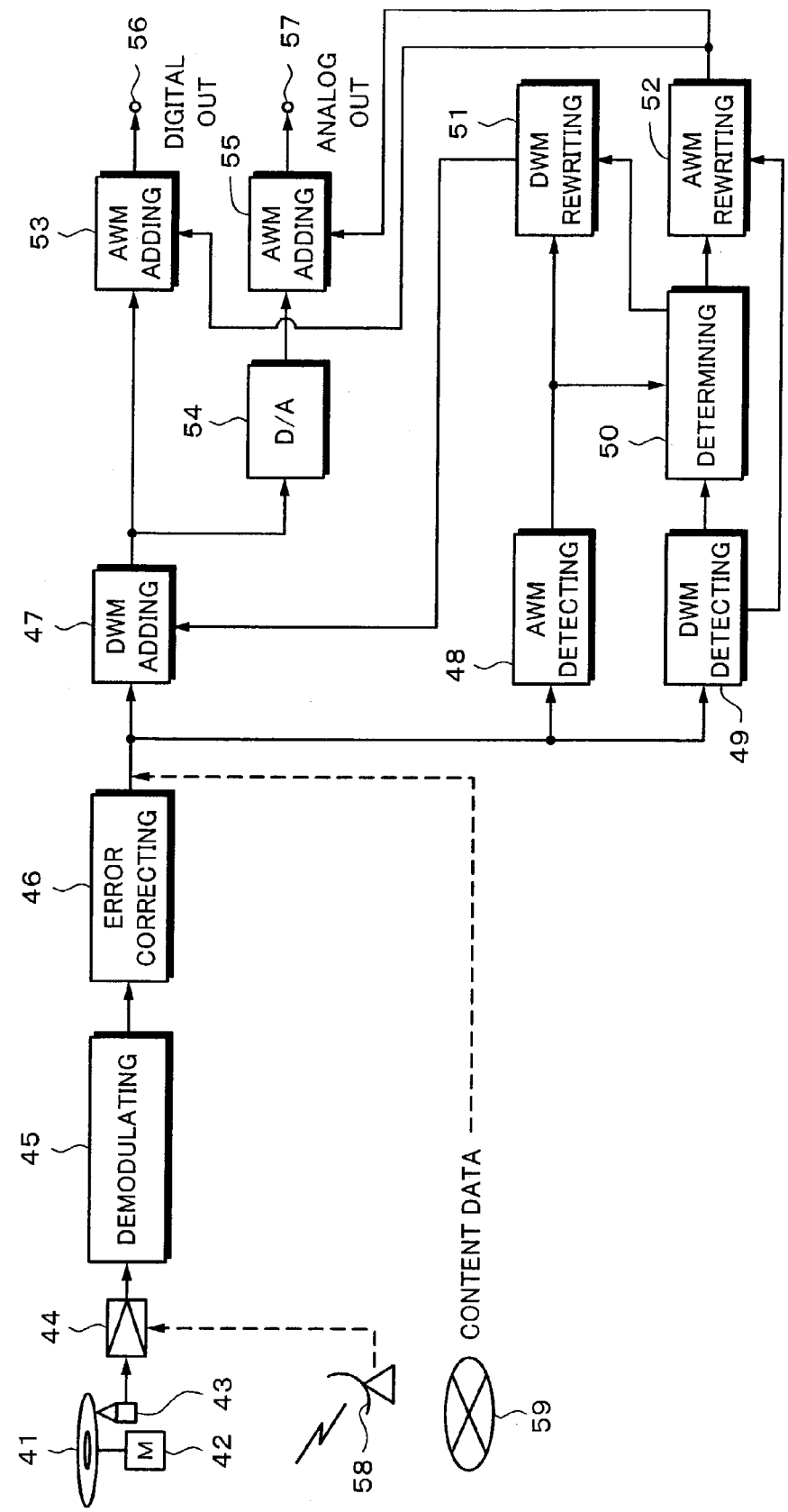
FIG. 5 is a block diagram showing a reproducing apparatus according to an embodiment of the present invention.

FIG. 5 shows the structure of a reproducing apparatus according to an embodiment of the present invention. According to the present invention, the reproducing apparatus shown in FIG. 5 can reproduce data from a record medium. In addition, according to the present invention, the reproducing apparatus can receive content data as a broadcast signal through an antenna 58 and receive content data through a network 59. A received signal received from the antenna 58 is supplied to an amplifier 44 as denoted by a broken line of FIG. 5. Data received from the network 59 is supplied to an output side of an error correcting circuit 46 as denoted by another broken line of FIG. 5. When the present invention is applied for a broadcast signal or data received from the network, the structure shown in FIG. 5 functions as an output device.

In FIG. 5, reference numeral 41 represents an optical disc as a record medium. The optical disc 41 is rotated by a spindle motor 42. Information recorded on the record medium 41 is read by an optical pickup 43. Content data for example digital audio data in which both an analog watermark and a digital watermark had been embedded has been recorded on the record medium 41 by the recording apparatus shown in FIG. 1.

A reproduction signal that is read from the record medium 41 by the optical pickup 43 is supplied to a digital demodulating circuit 45 through the reproducing amplifier 44. A demodulated signal demodulated by the digital demodulating circuit 45 is supplied to an error correcting circuit 46. The error correcting circuit 46 performs an error correcting process for the demodulated signal received from the demodulating circuit 45. An error that could not be corrected by the error correcting process is corrected by an interpolation or the like.

From the error correcting circuit 46, output data in which the error correcting process has been performed (namely, reproduction audio data) is obtained. The reproduction audio data is supplied to a DWM adding circuit 47, an AWM detecting circuit 48, and a DWM detecting circuit 49. The AWM detecting circuits 48 and 49 detect whether an analog watermark and a digital watermark have been added to the reproduction audio data and supply respectively detected output signals to a determining circuit 50. The output signal of the AWM detecting circuit 48 is also supplied to an DWM rewriting circuit 51. The output signal of the DWM detecting circuit 49 is also supplied to an AWM rewriting circuit 52. An output signal of the determining circuit 50 is supplied to both the rewriting circuits 51 and 52.

When only one of an analog watermark and a digital watermark has been detected from the reproduction audio data, the rewriting circuits 51 and 52 rewrite copy management information of one watermark corresponding to the content of copy management information contained in the other watermark detected by the determining circuit 50. In the example, copy management information is "rewritten" by newly generating one watermark using another watermark. Thus, the output signal of the AWM detecting circuit 48 is supplied to the DWM rewriting circuit 51. The output signal of the DWM detecting circuit 49 is supplied to the AWM rewriting circuit 52. The output signal of the determining circuit 50 is a signal for controlling the rewriting circuits 51 and 52 to rewrite information of watermarks corresponding to the detected signals supplied from the AWM detecting circuit 48 and the DWM detecting circuit 49.

The digital watermark rewritten by the DWM rewriting circuit 51 is supplied to the DWM adding circuit 47. The analog watermark rewritten by the AWM rewriting circuit 52 is supplied to AWM adding circuits 53 and 55. As was described above, when it is not necessary to rewrite the watermark detected by the determining circuit 50, the watermark adding circuits 47, 53, and 55 do not add a new watermark. An output signal of the DWM adding circuit 47 is supplied to the AWM adding circuit 53. An output signal of the AWM adding circuit 53 is obtained as a digital output signal from an output terminal 56. The output signal of the DWM adding circuit 47 is also supplied to a D/A converter 54. The D/A converter 54 converts the output signal of the DWM adding circuit 47 into an analog audio signal. The analog audio signal that is output from the D/A converter 54 is supplied to the AWM adding circuit 55. An output signal of the adding circuit 55 is obtained as an analog output signal from an output terminal 57.

The output terminals 57 and 58 are output terminals of reproduction signals. A digital output signal to be copied is obtained from another output terminal (not shown) of the reproducing apparatus. The permission and prohibition for the digital output signal (copy output signal) that is output from the other output terminal (not shown) is controlled corresponding to the copy management information contained in the detected watermark. Alternatively, the permission and prohibition of the copy output signal that is output from the other output terminal (not shown) may be controlled corresponding to the output signal of the determining circuit 50.

Figure 6:
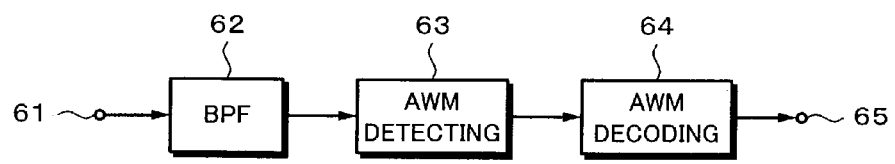
FIG. 6 is a block diagram showing an example of an analog watermark detecting circuit.

FIG. 6 shows an example of the structure of an analog watermark detecting circuit corresponding to the AWM detecting circuit 48. A reproduction digital audio signal is supplied from the error correcting circuit 46 to an input terminal 61. The reproduction digital audio signal that is input from the input terminal 61 is supplied to a band pass filter 62. The band pass filter 62 separates an analog watermark component from the reproduction digital audio signal. In the example shown in FIG. 2A, the center frequency of the pass band of the band pass filter 62 is 26 kHz. In the example shown in FIG. 2B, the center frequency of the pass band of the band pass filter 62 is 40 kHz. The watermark shown in FIG. 2A can be separated by a high pass filter as well as a band pass filter.

An output signal of the band pass filter 62 is supplied to an AWM detecting circuit 63. The AWM detecting circuit 63 detects an analog watermark component from the output signal of the band pass filter 62. The AWM detecting circuit 63 is for example a demodulating circuit. An output signal of the AWM detecting circuit 63 is supplied to an AWM decoding circuit 64. Copyright information for example copy management information is obtained from an output terminal 65.

Figure 7:
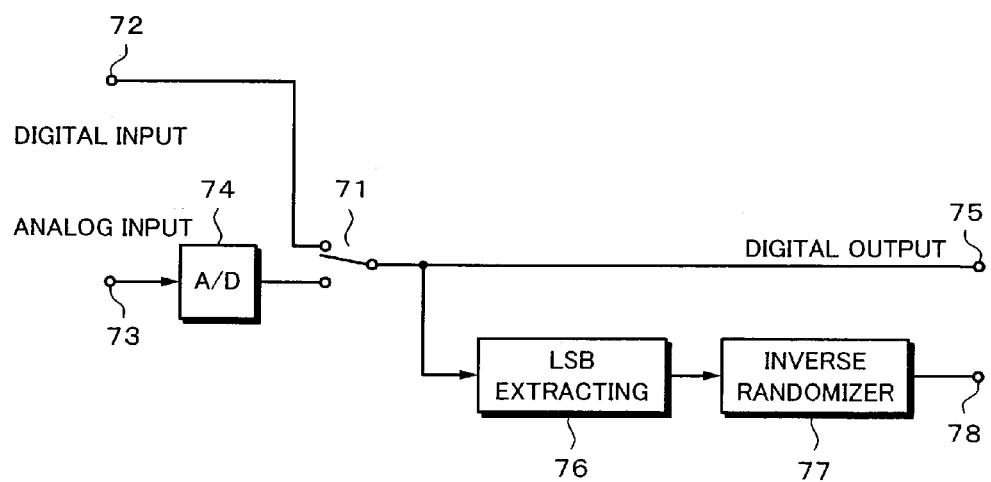
FIG. 7 is a block diagram showing an example of the structure of a digital watermark detecting circuit.

FIG. 7 shows an example of the structure of a digital watermark detecting circuit corresponding to the DWM detecting circuit 49. A switch circuit 71 selects one of a digital input signal that is input from an input terminal 72 or an output signal of an A/D converter 74. The A/D converter 74 converts an audio signal as an input analog signal into a digital signal. An output signal of the switch circuit 71 is obtained as a digital output signal from an output terminal 75.

The digital input signal that is input from the terminal 72 or the digital signal that is input from the A/D converter 74 through the switch circuit 71 is supplied to an LSB extracting circuit 76. The LSB extracted by the LSB extracting circuit 76 is supplied to an inverse randomizer 77. The inverse randomizer 77 decodes the LSB to copyright information. The copyright information that is output from the inverse randomizer 77 is obtained from an output terminal 78.

When an analog watermark is transmitted, input and output as an analog signal, the analog watermark can be left without a problem. In other words, the analog watermark is not lost from the analog signal as a content, but left. In contrast, when an analog watermark is transmitted as a digital signal, whether or not the analog watermark is left depends on the sampling accuracy and the filter characteristic with which the analog signal is converted into the digital signal. In the examples shown in FIGS. 2A and 2B, when an analog watermark is transmitted, input, and output as an analog signal, the analog watermark is left without a problem. In contrast, when an analog watermark is transmitted, input, and output as a digital signal to which an analog signal as a content is converted corresponding to the CD-DA system (sampling frequency of 44.1 kHz, 16-bit linear quantization, and 2-channel PCM), the analog watermark is lost in the converting process. Thus, the analog watermark is not left in the converted digital signal.

On the other hand, when a digital signal or digital data as a content is copied bit by bit corresponding to the IEC (International Electrotechnical Commission) 958 standard, the IEEE (Institute of Electrical and Electronics Engineers) 1394 standard, or the like, a digital watermark is not lost, but left in the digital signal or digital data. In contrast, when a digital signal or digital data is converted into an analog signal, there is a high possibility of which a digital watermark is lost. When data of 24 bits of each sample of the digital signal is converted into data of 16 bits, a digital watermark is lost from a digital signal.

Figure 8:
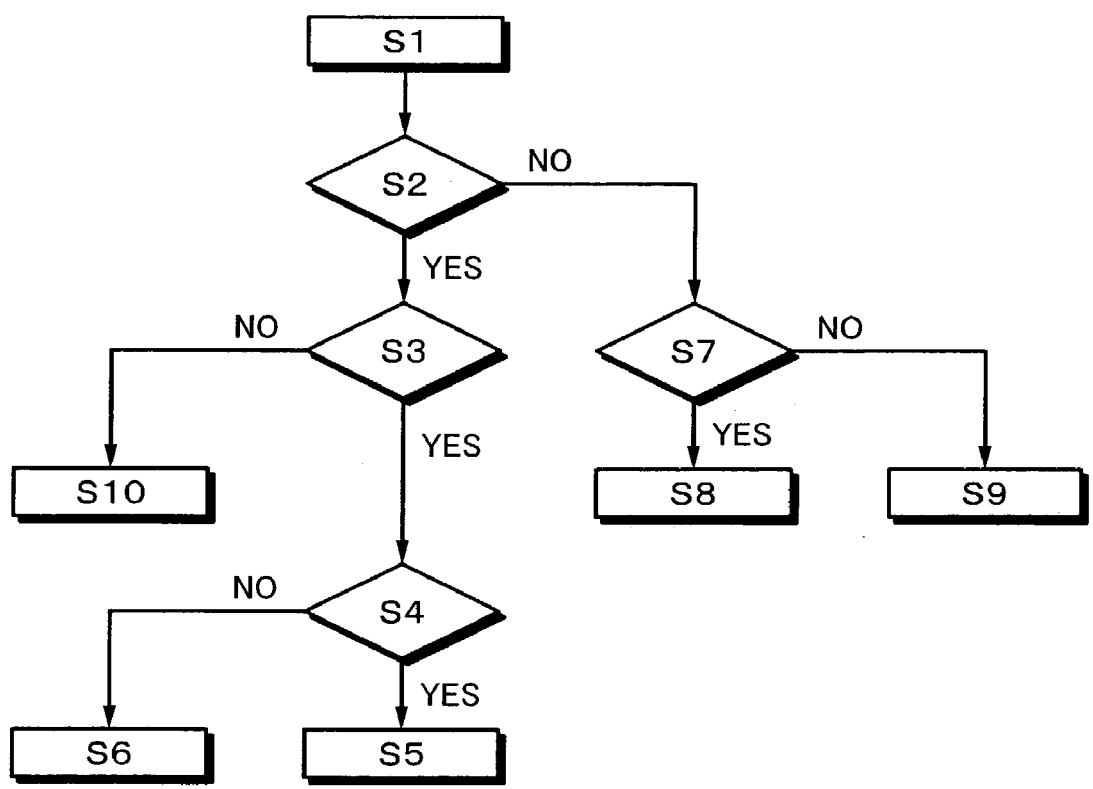
FIG. 8 is a flow chart for explaining the reproducing apparatus according to an embodiment of the present invention.

In the reproducing apparatus shown in FIG. 5, corresponding to a detected result of a watermark, a reproducing process shown in a flow chart of FIG. 8 is performed. First of all, at step S1, the DWM detecting circuit 49 and the AWM detecting circuit 48 perform detecting processes for a DWM and an AWM from a reproduction digital audio signal that is received from the error correcting circuit 46. In FIG. 5, the AWM detecting circuit 48 and the DWM detecting circuit 49 detect an analog watermark and a digital watermark from the reproduction digital audio signal, respectively. The detected results of the detecting circuits 48 and 49 are supplied to the determining circuit 50.

At step S2, corresponding to the detected result of the DWM detecting circuit 49, it is determined whether or not the reproduction digital audio signal contains a digital watermark. When the determining circuit 50 has determined that the reproduction digital audio signal contains a digital watermark, the flow advances to step S3. At step S3, corresponding to the detected result of the AWM detecting circuit 48, it is determined whether or not the reproduction digital audio signal contains an analog watermark. When the determined result at step S3 represents that the reproduction digital audio signal contains an analog watermark, the flow advances to step S4. At step S4, it is determined whether or not copyright information for example copy management information of the detected digital watermark is the same as that of the detected analog watermark. When the determined result at step S4 represents that the analog watermark matches the digital watermark, the flow advances to step S5. At step S5, corresponding to the matched copy management information, the copy operation for the reproduction digital audio signal as a content is controlled. For example, when the matched copy management information prohibits a copy operation, the output of the reproduction digital audio signal to be copied is prohibited. When the matched copy management information permits a copy operation for only one generation, the output of the reproduction digital audio signal to be copied is permitted. In addition, the copy management information for the reproduction digital audio signal that is output is rewritten so that the copy management information prohibits a copy operation. Moreover, a new digital watermark is added to the reproduction digital audio signal.

When the determined results at steps S2 and S3 represent that the reproduce digital audio signal contains a digital watermark and an analog watermark and the determined result at step SS4 represents that the digital watermark does not match the analog watermark, the flow advances to step S6. At step S6, corresponding to the stricter copy management information of the detected digital watermark and analog watermark, the copy operation for the reproduction digital audio signal is controlled. For example, when the copy management information of one watermark permits a copy operation for only one generation and the copy management information of the other watermark prohibits a copy operation, the copy management information that prohibits a copy operation is selected. As a result, the copy operation for the reproduction digital audio signal is prohibited. In other words, the output of the reproduction digital audio signal to be copied is prohibited.

When the determined result at step S2 represents that the reproduction digital audio signal does not contain a digital watermark corresponding to the detected result of the DWM detecting circuit 49, the flow advances to step S7. A step S7, it is determined whether or not the reproduction digital audio signal contains an analog watermark corresponding to the detected result of the AWM detecting circuit 48. When the determined result at step S7 represents that the reproduction digital audio signal contains an analog watermark, the flow advances to step S8. At step S8, corresponding to the detected analog watermark, the copy operation of the reproduction digital audio signal is controlled. When the determined result at step S7 represents that the reproduction digital audio signal does not contain an analog watermark, the flow advances to step S9. At step S9, the reproduction digital audio signal is treated as copy free data of which the user can freely copy it. Thus, the reproduction digital audio signal is output from the apparatus.

When the determined result at step S2 represents that the reproduction digital audio signal contains a digital watermark and the determined result at step S3 represents that the reproduction digital audio signal does not contain an analog watermark, the flow advances to step S10. At step S10, corresponding to the detected digital watermark, the copy operation for the reproduction digital audio signal (namely, the output of the reproduction digital audio signal) is controlled.

When the forgoing strong watermark has been added to the reproduction digital audio signal, at step S9 of which both an analog watermark and a digital watermark have not been detected, the copy operation for the reproduction digital audio signal may not be freely operated. Instead, corresponding to the strong watermark, the copy operation for the reproduction digital audio signal may be performed. When the determined result at step S2 represents that the reproduction digital audio signal contains a digital watermark and the determined result at step S3 represents that the reproduction digital audio signal does not contain an analog watermark or when the determined result at step S2 represents that the reproduction digital audio signal does not contain a digital watermark and the determined result at step S7 represents that the reproduction digital audio signal contains an analog watermark, corresponding to the detected digital watermark or analog watermark, an analog watermark or digital watermark that has not been detected may be rewritten or newly added. When the determined result at step S6 represents that the digital watermark does not match the analog watermark, corresponding to the stricter watermark, the other watermark may be rewritten.

As was described above, when only one of a analog watermark and a digital watermark has been detected, corresponding to the detected watermark, the copy operation for the reproduction digital audio signal is controlled. When both an analog watermark and a digital watermark have been detected, corresponding to the stricter watermark, the copy operation for the reproduction digital audio signal is controlled.

The present invention is not limited to the forgoing embodiments. In other words, within the scope and sprit of the present invention, various modifications and ramifications are available. For example, in the structure shown in FIG. 5, both an analog watermark and a digital watermark are detected. However, when an analog signal is copied, an analog watermark may be detected therefrom. Corresponding to the detected result, the copy operation for the content may be controlled. When a digital signal is copied, only a digital watermark may be detected therefrom. Corresponding to the detected result, the copy operation for the content may be performed. In such a manner, depending on whether a content to be copied is an analog signal or a digital signal, the watermark detecting process can be further simplified. The present invention can be applied for picture data and computer data such as software as a content as well as the forgoing audio data.

According to the present invention, since both a digital watermark and an analog watermark are embedded in an information signal, watermarks can be left in an analog transmission signal and a digital transmission signal. In other words, in each of the analog transmission and digital transmission, even if one of a digital watermark and an analog watermark is lost, the other watermark is left. According to the present invention, since a digital watermark and an analog watermark are independently used, they can be easily detected. In addition, they can be easily recorded and rewritten. Moreover, since the possibility of which a strong watermark is lost in a digital transmission and an analog transmission is very low, when the strong watermark is used along with an analog watermark or a digital watermark, a digital copy history, an analog copy history, and a compression history, and so forth can be obtained.

The invention claimed is:

1. A recording method for a record medium, comprising the steps of:
    adding a first watermark to an input information signal, the first watermark being added when the information signal is transmitted as an analog signal;
    converting the information signal to which the first watermark has been added into a digital signal;
    adding a second watermark to the converted digital signal, the second watermark being added when the information signal is transmitted as a digital signal;
    performing an encoding process for the signal to which the second watermark has been added; and
    recording the signal for which the encoding process has been performed to the record medium;
    wherein the information signal is music data and the first and second watermarks each contain copyright information including at least a performer name, a record company name, a copy permission, and a generation restriction;

wherein the first watermark has been embedded in a frequency band other than an audible frequency band of the information signal and the second watermark has been embedded in a low order bit of the converted digital signal.

2. A recording apparatus for a record medium, comprising:
- a first adding portion for adding a first watermark to an input information signal, the first watermark being added when the information signal is transmitted as an analog signal;
- a converting portion for converting the information signal to which the first watermark has been added into a digital signal;
- a second adding portion for adding a second watermark to the converted digital signal, the second watermark being added when the information signal is transmitted as a digital signal;
- an encode processing portion for performing an encoding process for the digital signal to which the second watermark has been added; and
- a recording portion for recording output data of the encode processing portion to the record medium;
- wherein the information signal is music data and the first and second watermarks each contain copyright information including at least a performer name, a record company name, a copy permission, and a generation restriction;
- wherein the first watermark has been embedded in a frequency band other than an audible frequency band of the information signal and the second watermark has been embedded in a low order bit of the converted digital signal.

3. A reproducing apparatus for a record medium, comprising:
- a decoder for decoding an information signal that is read from a record medium, a first watermark and a second watermark having been embedded in the information signal, the first watermark being embedded when the information signal is transmitted as an analog signal, the second watermark being embedded when the information signal is transmitted as a digital signal;
- a first detecting portion for detecting the first watermark from an output signal of the decoder;
- a second detecting portion for detecting the second watermark from the output signal of the decoder; and
- a controlling portion for outputting a control signal that causes one of the first watermark and the second watermark added to the output signal of the decoder to be rewritten corresponding to a condition represented by the other watermark corresponding to detected outputs of the first detecting portion and the second detecting portion;
- wherein the information signal is music data and the first and second watermarks each contain copyright information including at least a performer name, a record company name, a copy permission, and a generation restriction;
- wherein the first watermark has been embedded in a frequency band other than an audible frequency band of the information signal and the second watermark has been embedded in a low order bit of the converted digital signal.

4. The reproducing apparatus for the record medium as set forth in claim 3, further comprising:
- an adding portion for newly adding one of the first watermark and the second watermark to the output signal of the decoder corresponding to the control signal that is output from the controlling portion.

5. The reproducing apparatus for the record medium as set forth in claim 4,
- wherein when detection results of the first detecting portion and the second detecting portion represent that one of the first watermark and the second watermark has been detected, the controlling portion newly generates the first or second watermark that has not been detected and the adding portion adds the generated watermark to the output signal of the decoder.

* * * * *

UNITED STATES PATENT AND TRADEMARK OFFICE
CERTIFICATE OF CORRECTION

| | |
|---|---|
| PATENT NO. | : 7,284,128 B2 |
| APPLICATION NO. | : 10/204982 |
| DATED | : October 16, 2007 |
| INVENTOR(S) | : Yoichiro Sako |

It is certified that error appears in the above-identified patent and that said Letters Patent is hereby corrected as shown below:

On the Title of the patent Item 54 and in Column 1, Lines 1-7, the title should read as --RECORD MEDIUM, RECORDING METHOD THEREFOR, RECORDING APPARATUS THEREFOR, OUTPUT CONTROLLING METHOD FOR INFORMATION SIGNAL, REPRODUCING APPARATUS FOR RECORD MEDIUM, SIGNAL TRANSMITTING METHOD, AND CONTENT DATA--.

Signed and Sealed this

Ninth Day of September, 2008

JON W. DUDAS
*Director of the United States Patent and Trademark Office*